(12) United States Patent
Shiota

(10) Patent No.: US 9,372,623 B2
(45) Date of Patent: Jun. 21, 2016

(54) INFORMATION PROCESSING TERMINAL AND OPERATION CONTROL METHOD FOR SAME

(75) Inventor: Naoki Shiota, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 687 days.

(21) Appl. No.: 13/636,006

(22) PCT Filed: Mar. 17, 2011

(86) PCT No.: PCT/JP2011/056364
§ 371 (c)(1),
(2), (4) Date: Sep. 19, 2012

(87) PCT Pub. No.: WO2011/135944
PCT Pub. Date: Nov. 3, 2011

(65) Prior Publication Data
US 2013/0009903 A1    Jan. 10, 2013

(30) Foreign Application Priority Data

Apr. 30, 2010    (JP) ................................. 2010-105397

(51) Int. Cl.
*G06F 3/041*    (2006.01)
*G06F 3/0488*    (2013.01)
*G06F 3/0481*    (2013.01)
*G06F 3/0486*    (2013.01)

(52) U.S. Cl.
CPC .......... *G06F 3/04886* (2013.01); *G06F 3/0486* (2013.01); *G06F 3/0488* (2013.01); *G06F 3/04817* (2013.01)

(58) Field of Classification Search
CPC combination set(s) only.
See application file for complete search history.

(56) References Cited

U.S. PATENT DOCUMENTS

| 6,958,749 | B1 | 10/2005 | Matsushita et al. | |
|---|---|---|---|---|
| 8,300,017 | B2 * | 10/2012 | Kim | 345/173 |
| 8,631,345 | B2 * | 1/2014 | Kawaguchi | 715/790 |
| 8,854,315 | B2 * | 10/2014 | Lee | 345/173 |
| 8,963,849 | B2 * | 2/2015 | Shimotani et al. | 345/173 |
| 2008/0244454 | A1 | 10/2008 | Shibaike | |

FOREIGN PATENT DOCUMENTS

| JP | 11-164175 A | 6/1999 |
|---|---|---|
| JP | 2001-134382 A | 5/2001 |
| JP | 2002-140148 A | 5/2002 |
| JP | 2004-355606 A | 12/2004 |

(Continued)

OTHER PUBLICATIONS

Communication dated Jan. 20, 2015, issued by the Japanese Patent Office in counterpart Japanese application No. 2012-512716.

*Primary Examiner* — Abbas Abdulselam
(74) *Attorney, Agent, or Firm* — Sughrue Mion, PLLC

(57) ABSTRACT

To provide an information processing terminal capable of solving the problem in which the positions of operational objects cannot be adjusted in accordance with the holding style so as to improve operativity. A display input unit has a display screen and receives a touch operation made to the display screen. A detecting unit detects a position at which the touch operation has been made on the display screen. A control unit displays operational objects or icons on the display screen. The control unit also moves icons to an icon gathering area in accordance with the number of detected areas among a plurality of setting areas set up in the display screen, or the setting areas including an operated position detected by detecting unit 2.

10 Claims, 14 Drawing Sheets

(56) References Cited

FOREIGN PATENT DOCUMENTS

| JP | 2006-148536 A | 6/2006 |
|----|---------------|--------|
| JP | 2007-036544 A | 2/2007 |
| JP | 2008-027183 A | 2/2008 |
| JP | 2008-250620 A | 10/2008 |
| JP | 2009-122837 A | 6/2009 |
| JP | 2009-158989 A | 7/2009 |
| JP | 2009-261024 A | 11/2009 |
| JP | 2010-020601 A | 1/2010 |

* cited by examiner

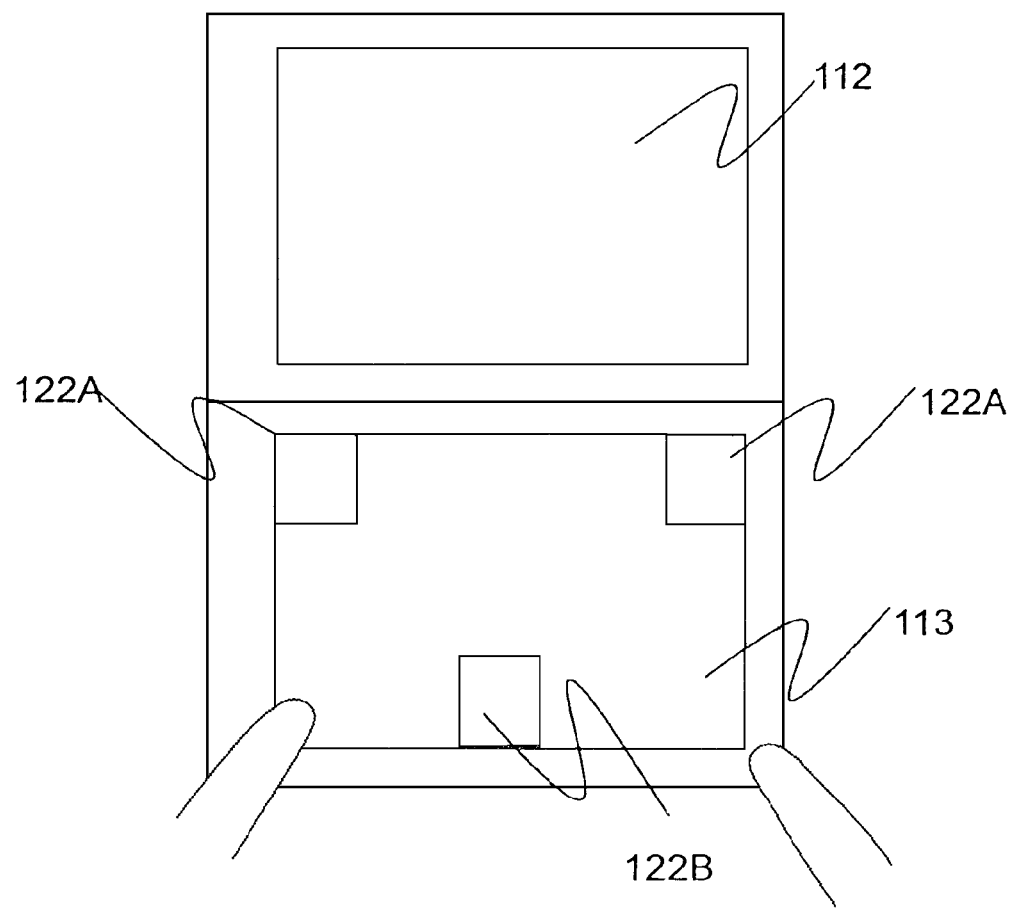

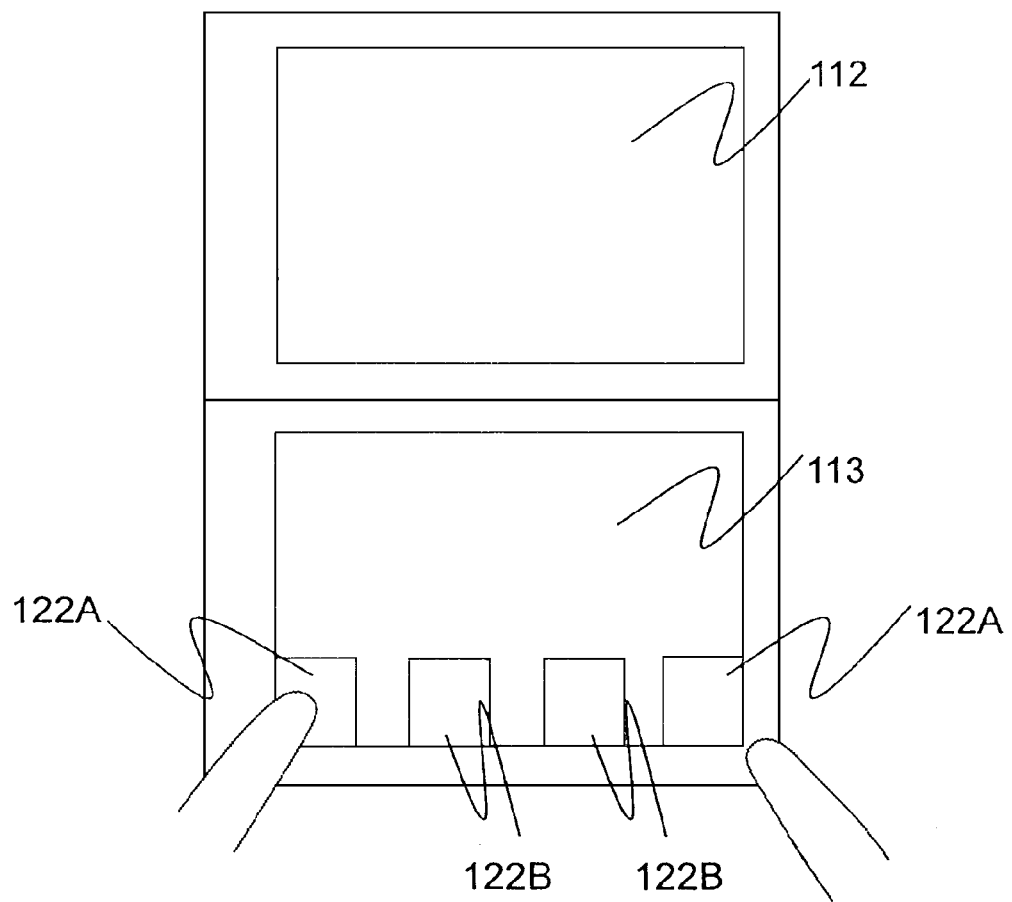

INFORMATION PROCESSING TERMINAL AND OPERATION CONTROL METHOD FOR SAME

CROSS REFERENCE TO RELATED APPLICATIONS

This application is a National Stage of International Application No. PCT/JP2011/056364 filed Mar. 17, 2011, claiming priority based on Japanese Patent Application No. 2010-105397, filed Apr. 30, 2010, the contents of all of which are incorporated herein by reference in their entirety.

TECHNICAL FIELD

The present invention relates to an information processing terminal and an operation control method for the same, and in particular relates to an information processing terminal equipped with a touch panel type display and an operation control method for the same.

BACKGROUND ART

In recent years, some mobile terminals such as mobile phones, PHSs (Personal Handy phone System), PDAs (Personal Data Assistance) and the like are equipped with a touch panel type display. Since, with such a mobile terminal, the user can touch an operational object displayed on the screen to make control, the user can perform an intuitive operation compared to button operations.

Further, recently, in the field of mobile terminals equipped with a touch panel type display, in order to further improve the operability, technologies to adjust the positions of operational objects in accordance with the user handling have been proposed or put to practical use.

For example, in the mobile terminal described in Patent Document 1, a plurality of keys each allotted with a predetermined character are displayed in two rows along two sides opposite each other. When the user makes a sliding operation, the keys displayed along one edge move to the other edge.

A control device described in Patent Document 2 is a control device for a digital camera, in which an operating button such as a shutter button or the like is displayed around an area on which the user touches the touch panel.

In a camera described in Patent Document 3, the display layout of operating buttons etc. is switched in accordance with the position on which the user touches the touch panel.

In the information display apparatus described in Patent Document 4, a drag operation on the touch panel is made by the user, the size of the enter screen is reduced and displayed in a predetermined area.

PRIOR ART DOCUMENTS

Patent Documents

Patent Document 1: JP2006-148536A
Patent Document 2: JP11-164175A
Patent Document 3: JP2009-158989A
Patent Document 4: JP2009-122837A

SUMMARY OF THE INVENTION

Problems to be Solved by the Invention

In recent years, in the field of mobile terminals having a touch panel type display, mobile terminals with a big display or a big their own, folding type terminals with two screens, formed of two components each having a display and connected to each other so as to be unfolded, and others have been proposed or put in practical use.

For mobile terminals as described above, the user can hold the terminal in various ways, i.e., with both hands or one hand. For example, the user may hold a mobile terminal at both sides thereof with both hands, or may hold the mobile terminal with one hand at the area close to its center of gravity.

In Patent Documents 1 to 5, each of them is configured on the assumption that each is held in particular way, such that a problem arises in which the positions of operational objects cannot be adjusted to conform to particular way in which the terminal is held in order to improve operability.

The object of the present invention is to provide an information processing terminal capable of solving the above problem, or the problem that the positions of the operational objects cannot be adjusted in conformity with the holding style so as to improve operability as well as providing an operation control method thereof.

Means for Solving the Problems

An information processing terminal of the present invention includes: a display input unit having a display screen and receiving a touch operation to the display screen; a detecting unit detecting an operated position at which the touch operation has been made on the display screen; and a control unit displaying operational objects on the display screen and moving the operational objects to a gathering area in accordance with the number of detected areas or the setting areas including the operated position detected by the detecting unit, among a plurality of setting areas set up in the display screen.

An operation control method of the present invention is an operation control method of an information processing terminal having a display screen, comprising the steps of: displaying operational objects on the display screen; receiving a touch operation to the display screen; detecting an operated position at which the touch operation has been made on the display screen; and, moving the operational objects to a gathering area in accordance with the number of detected areas as the setting areas including the detected operated position, among a plurality of setting areas set up in the display screen.

Effect of the Invention

According to the present invention, it is possible to adjust the position of operational objects in accordance with the holding style so as to improve operability.

BRIEF DESCRIPTION OF THE DRAWINGS

FIG. 20B is a view showing another example of a setting area in the fourth exemplary embodiment.

FIG. 20C is a view showing another example of a setting area in the fourth exemplary embodiment.

MODE FOR CARRYING OUT THE INVENTION

Figure 1:
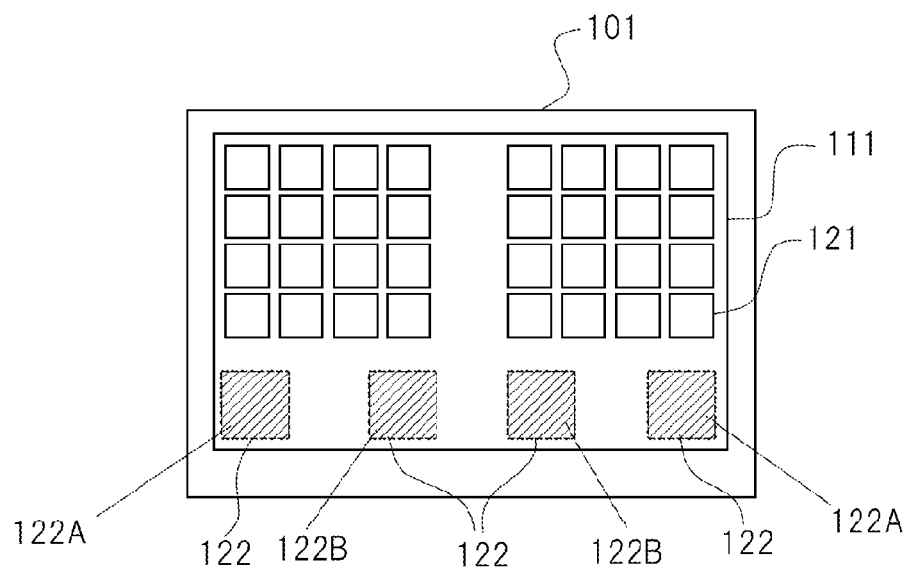
FIG. 1 is a front view of an information processing terminal in the first exemplary embodiment.

Next, exemplary embodiments of the present invention will be described with reference to the drawings. In the description hereinbelow, configurations having the same functionality are allotted the same reference numerals and their description may be omitted.

FIG. 1 is a front view showing an information processing terminal in the first exemplary embodiment of the present invention. Information processing terminal 101 shown in FIG. 1 is a mobile terminal such as a mobile phone, PHS, PDA or the like, and is used on the assumption that the user holds information processing terminal 101 with one hand or both hands.

Information processing terminal 101 includes a display input unit integrated with a display means and an input means. In FIG. 1, display screen 111, as the display means, is shown. Though not illustrated, the input means is a touch sensor and senses a touch operation (contact operation, clicking operation, long press operation, etc.) from the user. There are various sensing methods for touch sensors, such as pressure-sensitive types, capacitive sensing types and the like, but the present exemplary embodiments should not be particularly limited.

In FIG. 1, information processing terminal 101 executes an application launcher for starting up application programs (which will be abbreviated hereinbelow as applications). In display screen 111, a plurality of application icons (which will be abbreviated hereinbelow as icons) 121 generated by the application launcher are displayed. Icons 121 are operational objects to start up applications. When the user touches an icon, the related application starts up.

There are a plurality of setting areas 122 for moving operational objects. Setting areas 122 include first areas 122A set up for cases when information processing terminal 101 is held with both hands and second areas 122B set up for cases when information processing terminal 101 is held with one hand.

Since it is thought that when the user holds information processing terminal 101 with both hands, the user in most cases holds information processing terminal 101 at both sides with both hands, first areas 122A are arranged within the ranges that the thumbs of both hands reach when the user holds information processing terminal 101 at both sides with both hands. On the other hand, since it is thought that when the user holds information processing terminal 101 with one hand, the user in most cases holds information processing terminal 101 around its center (near its center of gravity) with one hand, second areas 122B are arranged within the range the thumb of the one hand reaches when the user holds information processing terminal 101 with one hand.

Here, if information processing terminal 101 is relatively light or some other cases, second areas 122B are not necessarily located near the center of gravity of information processing terminal 101. Further, setting areas 122 should be invisible on display screen 111. Moreover, setting areas 122 may change depending on the posture of information processing terminal 101.

Figure 2:
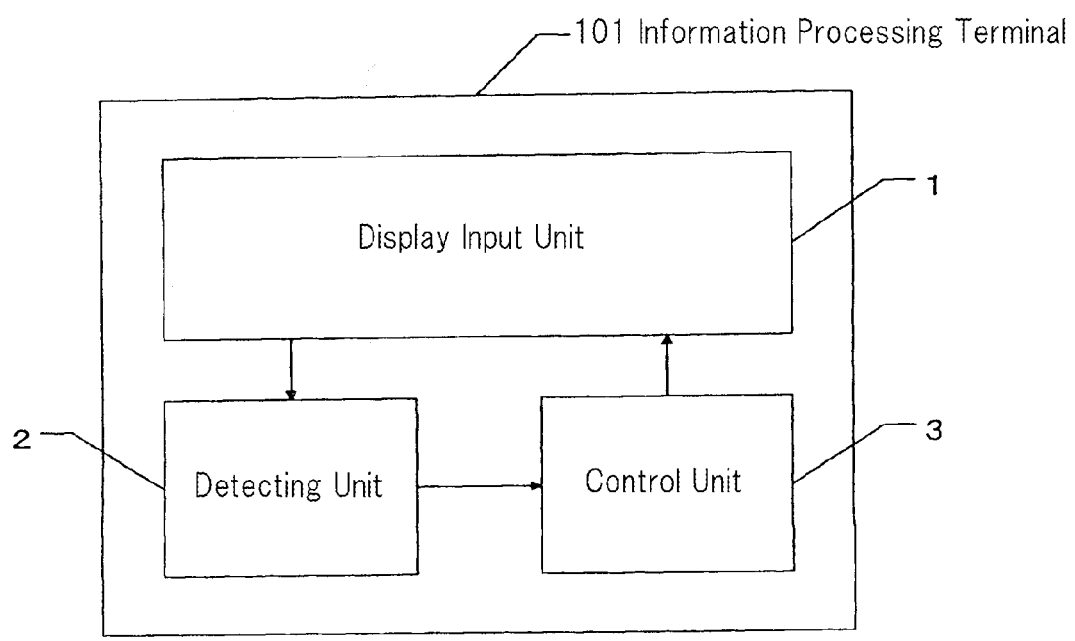
FIG. 2 is a block diagram showing a functional configuration of the information processing terminal in the first exemplary embodiment.

FIG. 2 is a block diagram showing a functional configuration of information processing terminal 101. In FIG. 2, information processing terminal 101 includes display input unit 1, detecting unit 2 and control unit 3.

As stated above, display input unit 1 includes a display screen, receives touch operations made to the display screen, and is a touch panel type display, for example.

Detecting unit 2 detects the position which the user has touched on the display screen of display input unit 1. Here, detecting unit 2 expresses the operated position in terms of the coordinates in the coordinate system determined beforehand on the display screen.

Control unit 3 executes an application and displays operational objects generated by the application on the display screen. The operational objects are, for example icons 121 shown in FIG. 1.

When a predetermined touch operation has been made on display input unit 1, control unit 3 moves the operational objects on the display screen to icon gathering areas in conformity with the number of detected areas, or setting areas 122 including the operated positions detected by detecting unit 2, among the setting areas 122 set in the display screen. In the present exemplary embodiment, control unit 3 takes up all the detected areas as the icon gathering areas. However, the detected area and the icon gathering area may be deviated more or less from each other, or may be more or less different in size. With this arrangement, it is possible to further improve operability by not letting icons gather within the area of the operated position.

As one example, description will be made on a case where the state of the display screen before a touch operation is given as display screen 111 shown in FIG. 1.

Figure 3:
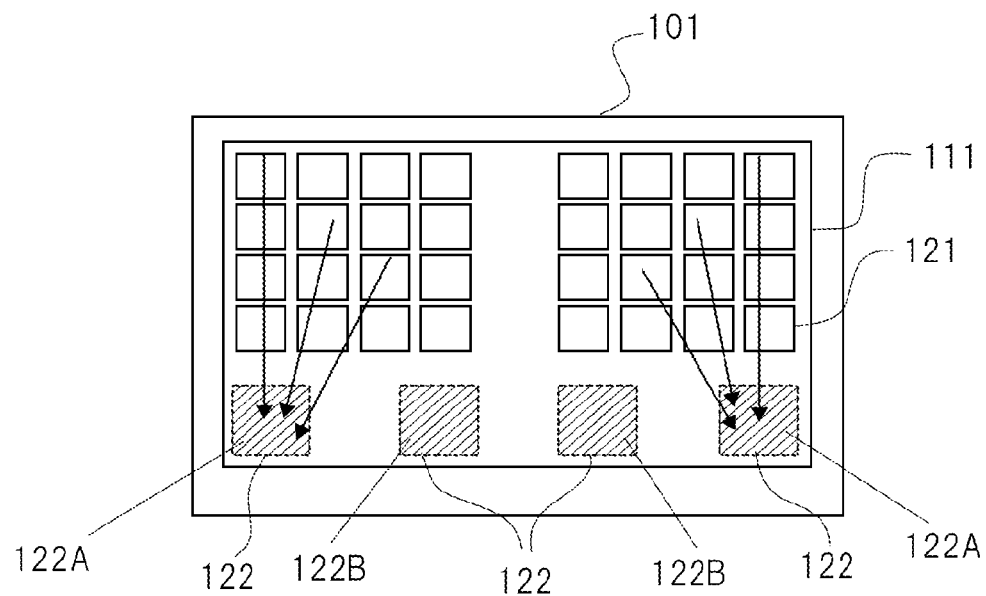
FIG. 3 is a view showing one status example of the information processing terminal.
Figure 4:
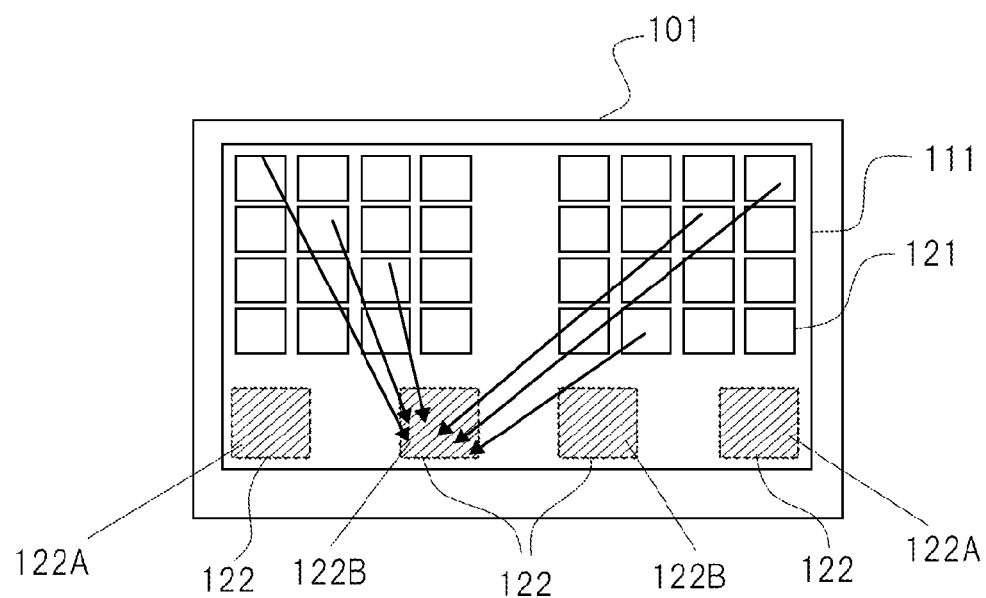
FIG. 4 is a view showing another status example of the information processing terminal.

When the user, holding information processing terminal 101 with both hands, has touched both first areas 112A, control unit 3 moves icons 121 to first areas 122A, as shown in FIG. 3. Further, when the user, holding information processing terminal 101 with one hand, has touched one of second areas 122B, control unit 3 moves icons 121 to the touched second area 122B, as shown in FIG. 4.

As described heretofore, according to the present exemplary embodiment, display input unit 1 has a display screen and receives a touch operation made to the display screen. Detecting unit 2 detects position that has been touched on the display screen. Control unit 3 displays icons 121 as operational objects on the display screen. Control unit 3 also moves icons 121 to the icon gathering areas in conformity with the number of the detected areas or the setting areas including the positions detected by detecting unit 2, among multiple setting areas 122 set inside the display screen.

In this case, icons 121 are moved to the icon gathering areas in conformity with the number of the detected areas or the setting areas including the positions where a touch operation has been made. Since the number of detected areas reflects the holding style such as whether information processing terminal 101 is held with both hands or with one hand, and the like, it is possible to adjust the positions of the operated objects so as to enhance operability in conformity with the holding style.

Further, in the present exemplary embodiment, control unit 3 takes up all the detected areas as the icon gathering areas. In this case, it is possible to move icons to a place at which the user touched or its vicinity, hence it is possible to further enhance operability.

Next, the second exemplary embodiment will be described.

In this exemplary embodiment, information processing terminal 101 will be described in further detail by taking an example where a plurality of display screens are provided. The number of display screens is not particularly limited, but two screens are assumed for convenience sake.

Figure 5:
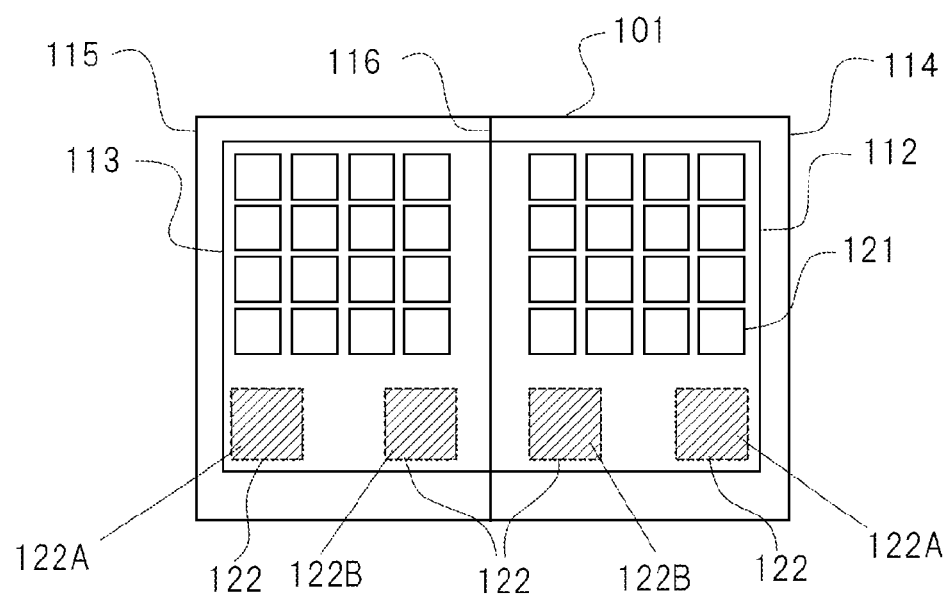
FIG. 5 is a front view of an information processing terminal in the second exemplary embodiment.

FIG. 5 is a front view of an information processing terminal in the present exemplary embodiment. In FIG. 5, information processing terminal 101 includes display screens 112 and 113. Here, in the present exemplary embodiment, information processing terminal 101 includes components 114 and 115, component 114 having display screen 112 and component 115 having display screen 113. Components 114 and 115 are connected pivotally (in an openable/closable manner) on pivot 116 by means of, for example a hinge mechanism. Further, display screens 112 and 113 each have at least one setting area 122. In the following description, display screens 112 and 113 each have one first area 122A and one second area 112B.

The functional configuration of the information processing terminal in the present exemplary embodiment is the same as that shown in FIG. 2.

Further, in the present exemplary embodiment, each setting area 122 has a related region, and the predetermined touch control for moving icons 121 includes first and second operations.

When display input unit 1 receives the first operation, control unit 3 moves icons 121 in the related region of the detected area including the operated position of the first operation. When display input unit 1 receives the second operation, control unit 3 moves icons 121 included, in the whole of the related region of each setting area 122 or in both display screens 112 and 113.

In the following description, it is assumed that the whole display screen having a setting area 122 is configured as the related region of setting area 122. Accordingly, when the first operation is made, control unit 3 will move operational objects in the display screen including the detected area, among displays screens 112 and 113. Here, the first operation is a short press operation, and the second operation is a long press operation.

Figure 6:
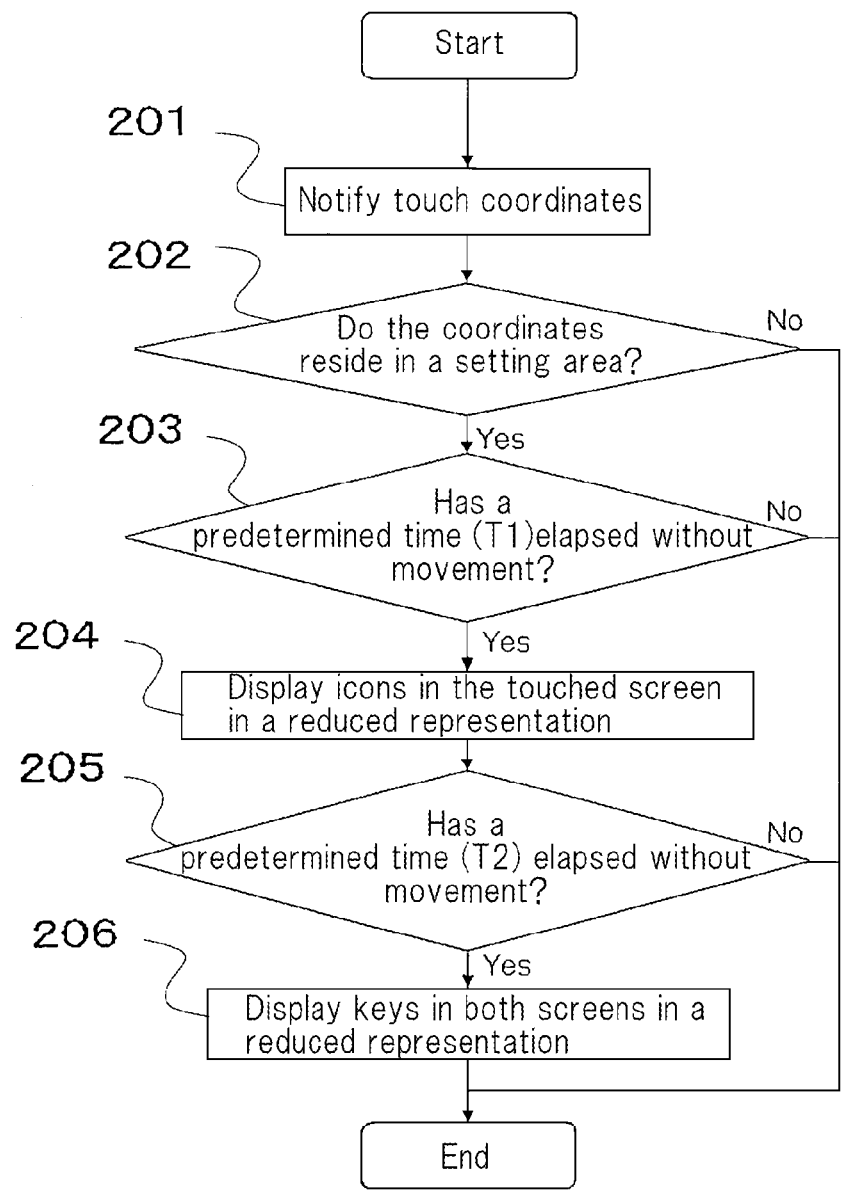
FIG. 6 is a flow chart for explaining one operational example of the information processing terminal in the second exemplary embodiment.

FIG. 6 is a flow chart for explaining the operation of information processing terminal 101 of the present exemplary embodiment. It is assumed herein that as the initial state of information processing terminal 101, or as the state before a touch operation is made, the application launcher is displayed across both display screens 112 and 113 while the user is not touching any of display screens 112 and 113

First, as the user touches (touches or presses) display screen 112 or 113, detecting unit 2 detects the touch coordinates of the touch and notifies control unit 3 of the touch coordinates (Step 201). Detecting unit 2 continues to notify the touch coordinates while being touched, and if the touch coordinates change, the detecting unit changes the touch coordinates to be notified in accordance with the change.

Control unit 3, receiving the touch coordinates, determines whether the touch coordinates are included in any of setting areas 122. Here, it is assumed that control unit 3 has information on the coordinates of setting areas 122 in advance. When the touch coordinates are not included in any setting area 122, control unit 3 ends operation without doing anything (Step 202).

When the touch coordinates are included in a setting area 122 (it is assumed below that the touch coordinates are included in first area 122A), control unit 3 monitors the touch coordinates and determines whether or not the touch coordinates have been changed within a first predetermined time (which will be referred to hereinbelow as T1 sec.). When the touch coordinates have been changed within T1 sec., or when the user moved or released his/her finger before the lapse of T1 sec., the control unit ends the operation without doing anything (Step 203).

When the touch coordinates have not been changed within T1 sec., control unit 3 determines that a short press operation was made. Then, control unit 3, based on the touch coordinates, identifies the touched display screen (it is assumed below that display screen 112 was touched). Control unit 3 reduces icons 121 displayed on the identified display screen 112 and moves them to the touched setting area (Step S204).

Figure 7:
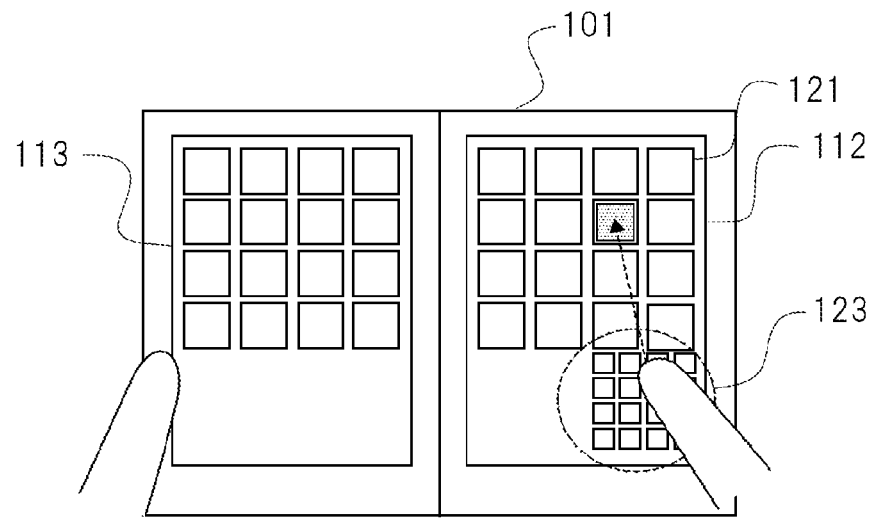
FIG. 7 is a view showing another status example of the information processing terminal.

FIG. 7 is a view showing information processing terminal 101 in a state in which icons are shown in a reduced representation. In FIG. 7, icons 123 are the reduced representations of those included in display screen 112 among icons 121. In this state, the user moves his/her finger and while the user continues to touch display screen 112, the icon 123 remaining at the touch coordinates, is put into a selected condition. Here, in FIG. 7, the icon 121 corresponding to the icon 123 in its selected condition is indicated as solid shading.

Returning to the description with FIG. 6. Moving the icons, control unit 3 determines whether or not the touch coordinates have been changed within a predetermined second fixed time (which will be referred to as T2 sec.). When the touch coordinates have been changed within T2 sec., that is, when the user moved or released his/her finger before a lapse of T2 sec., the control unit ends the operation without doing anything (Step 205).

When the touch coordinates have not been changed within T2 sec., control unit 3 determines that a long press was made. Then, control unit 3 reduces icons 121 displayed on display screen 113 and moves them to the setting area being touched, so as to display the icons 121 displayed on all display screens 112 and 113, in the setting area 122 being touched, in a reduced representation (Step 206).

Figure 8:
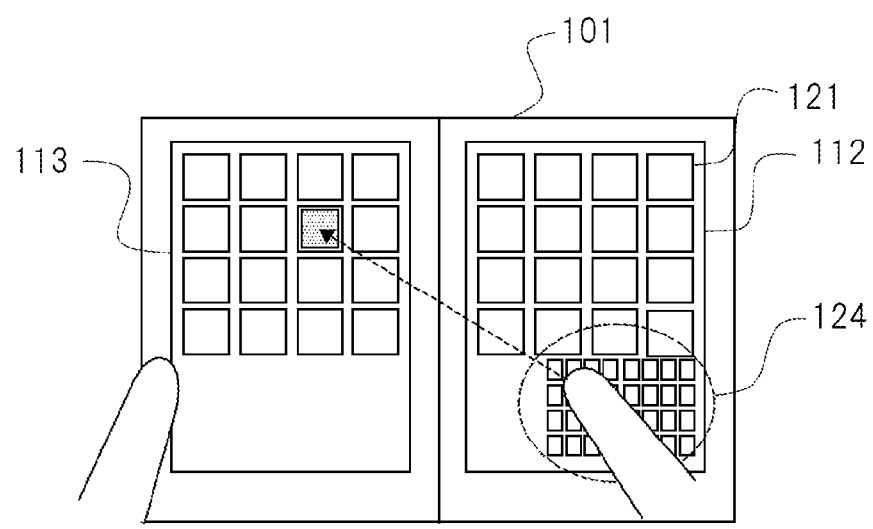
FIG. 8 is a view showing another status example of the information processing terminal.

FIG. 8 is a view showing information processing terminal 101 in which icons of two screens are displayed in a reduced representation. In FIG. 8, icons 124 are the reduced representations of icons 121 displayed on all display screens 112 and 113. When the user moves his/her finger while continuing to touch display screen 112 in this state, icon 124 that is located at the touch coordinates is put into the selected state. In FIG.

8, the icon 121 that corresponds to the icon 124 being selected is indicated with solid shading.

Figure 9:
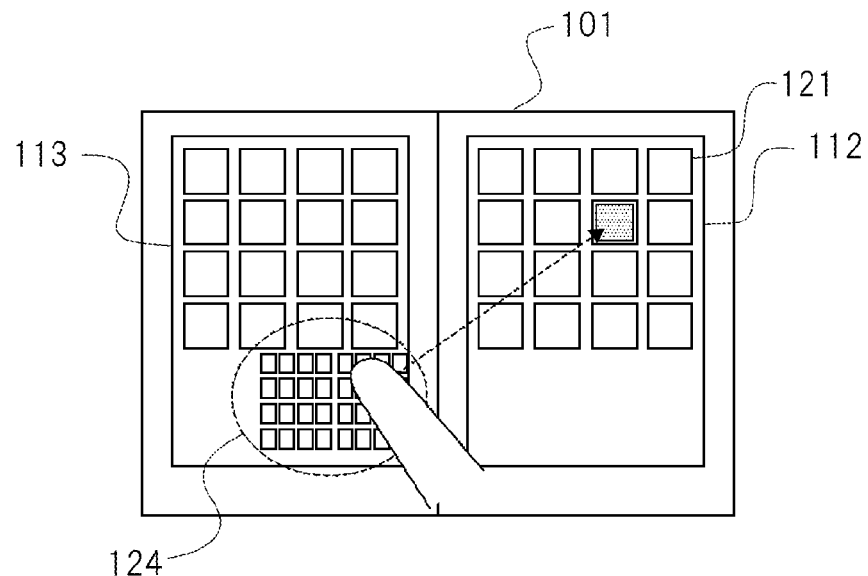
FIG. 9 is a view showing another status example of the information processing terminal.

In the above operation, the touched setting area 122 or the detected area is assumed to be first area 122A. However, setting areas 122 also include second area 122B as stated above. Naturally, the above operation also holds when the touched setting area 122 is second area 122B. In this case, information processing terminal 101 being in a condition in which icons of the two screens are displayed in a reduced representation when information processing terminal 101 is held around its center with one hand, is as shown in FIG. 9.

Figure 10:
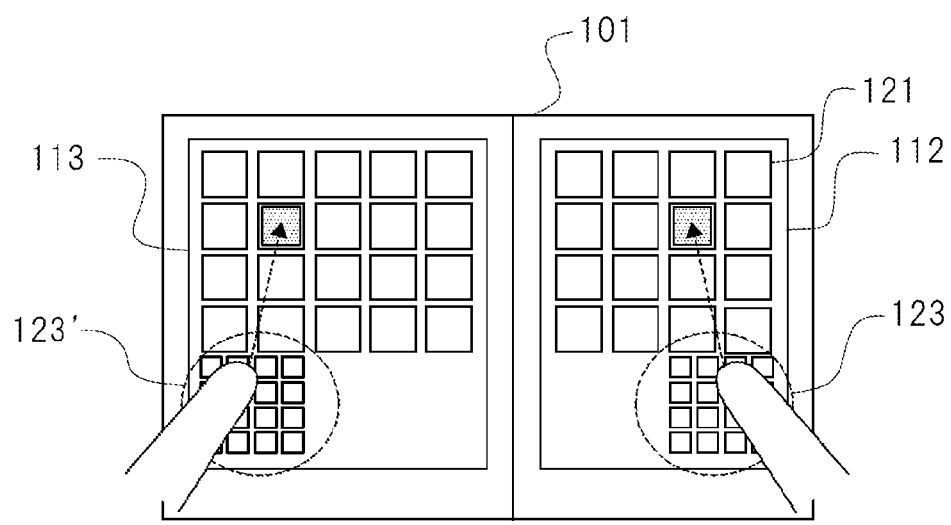
FIG. 10 is a view showing another status example of the information processing terminal.

When both first areas 122A are touched, control unit 3 moves icons 121 displayed in display screen 112 to the detected area of the same display screen 112, and icons 121 displayed in display screen 113 are moved to the detected area of the same display screen 113. Information processing terminal 101 in this case is as shown in FIG. 10. In this case, since all the icons 121 have been displayed in a reduced representation by a short press operation, the display state will not change if a long press is made. Here, icons 123' are the reduced representations of those included in display screen 113 among icons 121.

Figure 11:
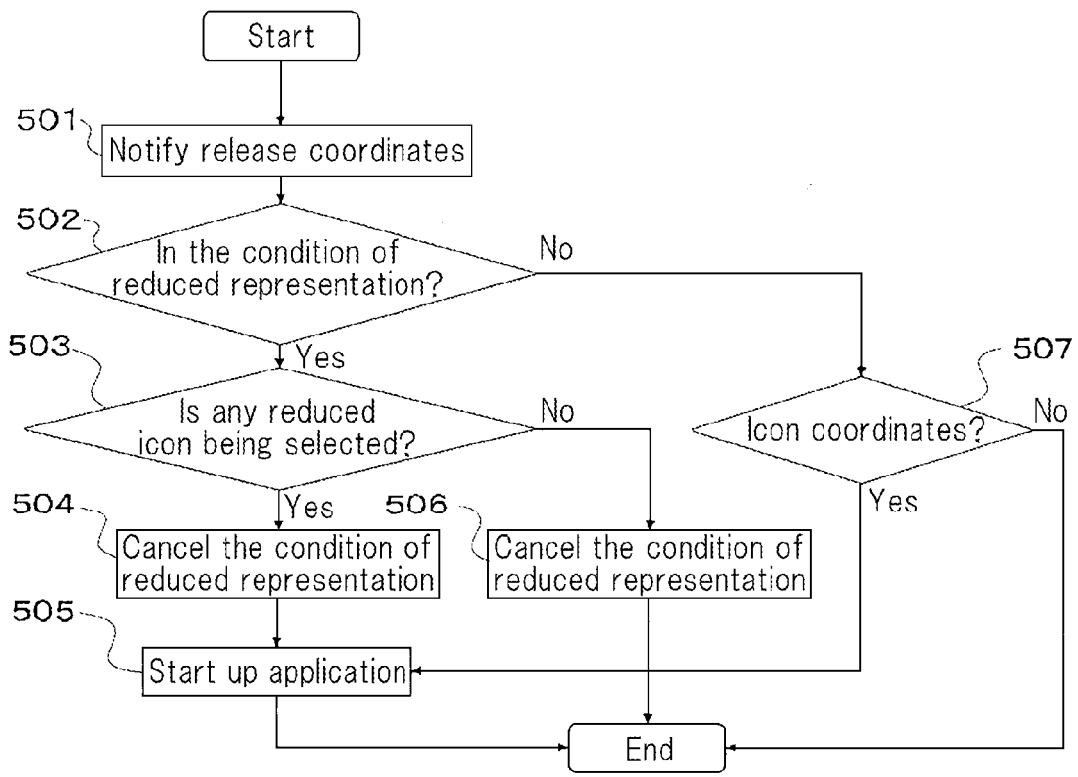
FIG. 11 is a flow chart for explaining another operational example of the information processing terminal in the second exemplary embodiment.

FIG. 11 is a flow chart for explaining the operation of information processing terminal 101 when the user releases his/her finger that touched on the display screen.

First, when the user releases his/her finger, detecting unit 2 stops notifying the touch coordinates (Step 501).

When notification of the touch coordinates is stopped, control unit 3 determines that the latest input of the touch coordinates are as the release coordinates which the user released. Then, control unit 3 confirms the current displayed state. Specifically, control unit 3 checks the displayed state, i.e., whether or not icons 121 for one screen or two screen are displayed in a reduced representation (Step S502).

When icons 121 are not displayed in a reduced representation, control unit 3 determines whether the release coordinates coincide with the corresponding icon coordinates (Step 507). If the release coordinates coincide with the icon coordinates, the application corresponding to that icon is started up (Step S505). On the other hand, if the release coordinates differ from the icon coordinates, the operation is ended without doing anything. The operation, when no icon is displayed in a reduced representation, is the same as the standard operation of the application launcher.

It is determined at Step S502 that icons are displayed in a reduced representation, control unit 3 determines whether any of the icons displayed in a reduced representation are in a selected condition (Step 503).

When any of the icons given in a reduced representation is not in a selected condition, control unit 3 cancels the reduced representation (Step 506), then ends the operation.

On the other hand, when one of the icons given in a reduced representation is in a selected condition, control unit 3 cancels the condition of reduced representation (Step 506), then the application corresponding to that icon in the selected condition is started up (Step 505).

By the way, it is not necessary to always set up the setting areas. For example, in a case where the user puts information processing terminal 101 on a desk or other cases, the icon gathering function for moving icons, described in the present exemplary embodiment, does not need to be ON (active). On the contrary, when, for example the application being displayed allocates another function than the icon gathering function, in the area corresponding to the setting area, there occur a risk of operation mistake and degrading operability, such that the function and the icon gathering function can be executed simultaneously by mistake.

In order to solve this problem, it is possible to adapt the above icon gathering function to be turned on and off. More specifically, it is possible to provide such a configuration in which an operational object for switching that causes control unit 3 to turn on and off the icon gathering function is displayed on the display screen, and based on the detecting result from detecting unit 2, the control unit can turn on or off the icon setting areas when a particular touch operation is made on the operational object for switching.

Figure 12A:
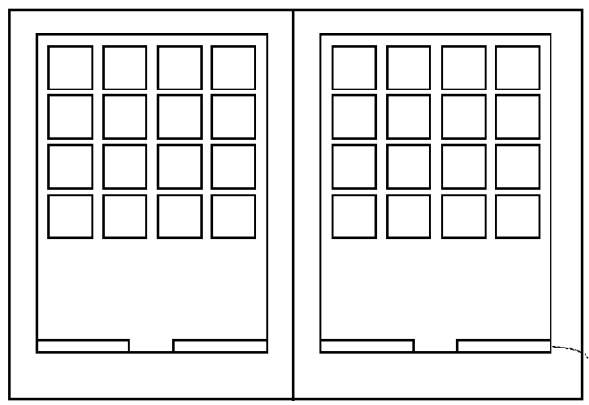
FIG. 12A is a view showing one example of operational objects for switching.

FIG. 12A is a view showing one example of the operational object for switching. In FIG. 12A, the icon gathering function is turned off, hence no setting area is set up. Bars 125 as the operational object for switching are displayed at the bottom of display screens 112 and 113.

Figure 12B:
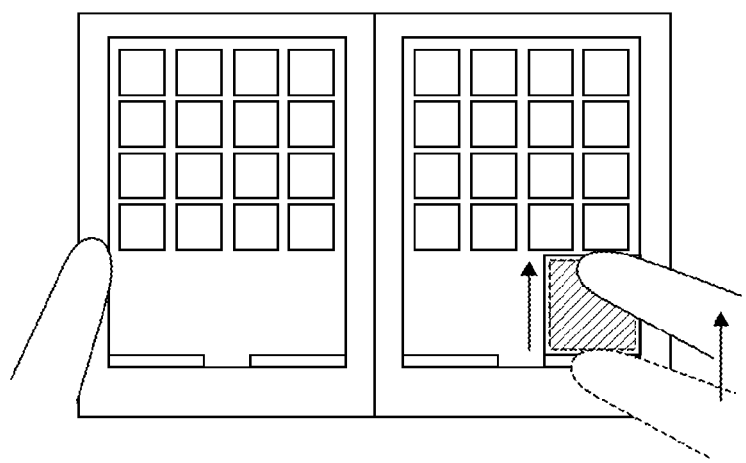
FIG. 12B is a view for illustrating a touch operation for switching ON or OFF of an icon gathering function.

As the user drags an area in which bar 125 is displayed, from the screen edge inwards, as shown in FIG. 12B, the icon gathering function is turned on so as to be able to set up setting areas 122 as shown in FIG. 5. On the other hand, when the user drags an area the opposite direction, setting areas 122 can be hidden as shown in FIG. 12A. With this, it is possible to explicitly show whether or not setting areas are set up, so that it is possible to reduce an erroneous operation.

The above description was given by taking an example in which an application launcher is being executed, but the present invention can be adapted to cases where other applications are being run. As one example of other applications, a case where Web browser is being executed will be described hereinbelow.

Figure 13:
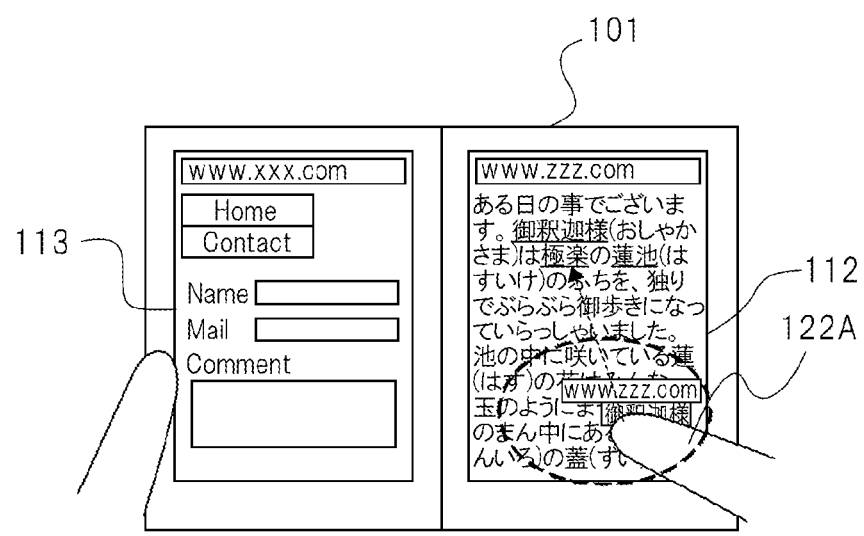
FIG. 13 is a view showing another status example of the information processing terminal.

FIG. 13 is a view showing an information processing terminal in a case where a Web browser is being executed. In FIG. 13, control unit 3 displays different Web sites on display screens 112 and 113, respectively while a state after the user has touched first area 122A in display screen 112 for T1 sec., is displayed.

In the above-described application launcher, icons are the operational objects. In contrast to this, in the Web browser, links, input forms, URLs (Uniform Resource Locator), entry fields and the like are the operational objects. Accordingly, in FIG. 13, the link and URL entry field as the operational objects in display screen are reduced in size and are displayed in first area 122A. Further, when the user releases his/her finger in the condition in which an operational object has been selected, the same operation as that when the operational object is touched at the time of normal display is made. For example, when the user releases his/her finger in the condition in which a link displayed in a reduced representation has been selected, the browser displays the linked Web page corresponding to the aforementioned link.

Figure 14:
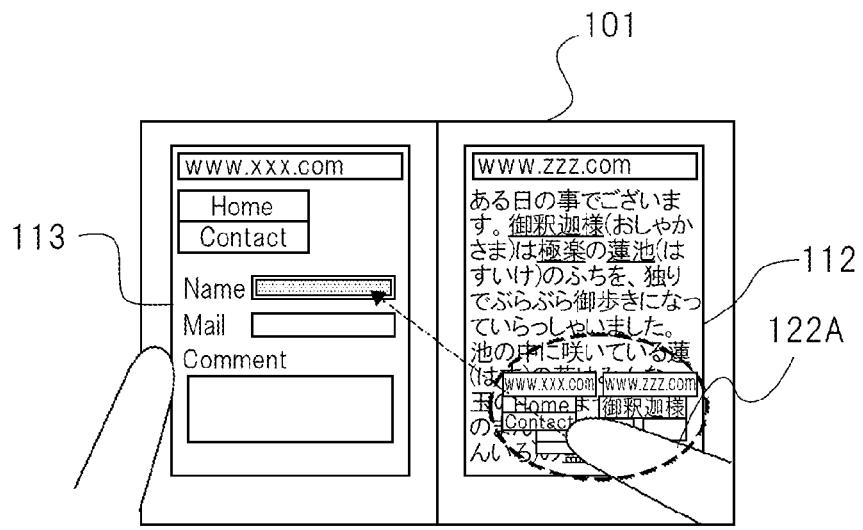
FIG. 14 is a view showing another status example of the information processing terminal.

In the state shown in FIG. 13, when the user touches a position without changing the touch position for more T2 sec., in information processing terminal 101, the input form URL entry field as the operational objects in display screen 113 are additionally displayed in first area 122A in a reduced representation, as shown in FIG. 14.

As described heretofore, according to the present exemplary embodiment, for each setting area 122 a related region is designated. Control unit 3 moves the operational objects included in the related region of a detected area. Accordingly, it is possible to mitigate movement of operational objects which are not needed for the user, hence operability can be improved.

Further, in the present exemplary embodiment, the predetermined touch operations include the first and second operations. When display input unit 1 receives the first operation, control unit 3 moves the operational objects included in the related region of a detected area. On the other hand, when the display input unit 1 receives the second operation, control unit 3 moves the operational objects included in all related regions of setting areas 122. Accordingly, the user is able to select operational objects to be moved depending on the status, hence it is possible to further improve operability.

Moreover, in the present exemplary embodiment, there are a plurality of display screens, each having at least one setting area. Accordingly, even if the display screens are changed depending on the holding style, it is possible to adjust the positions of operational objects in conformity with the holding style so as to improve operability.

Furthermore, in the present exemplary embodiment, control unit 3 moves the operational objects in the display screen including a detected area, among display screens. In this case, it is possible to mitigate movement of unnecessary operational objects, such as operational objects other than the display screen the user has not recognized, operability can be improved.

Next, the third exemplary embodiment will be described.

The present exemplary embodiment illustrates an information processing terminal in which control unit 3 changes operational objects to be moved in accordance with the displayed condition of the application.

In the following description, an application which control unit 3 executes is in the full-screen mode in which displayed information is fully displayed across display screens 112 and 113 and is in the single-screen mode in which display information is displayed either on display screen 112 or 113. The operational objects such as icons explained in the first and second exemplary embodiments, are included in the displayed information generated by the application. The full-screen mode is also called multi screen mode.

Control unit 3 executes the application in full-screen mode and in single-screen mode. The mode of the application may be switched during execution of the application. Control unit 3 may execute applications separately for display screens 112 and 113, and may display the displayed information of each application on the display screen that corresponds to the application. In this case, display screens 112 and 113 each display information for a different application.

When the application is executed in full-screen mode, control unit 3 moves the operational objects included in both display screens 112 and 113 if the detected area is either in first area 122A or second area 122B.

Figure 15:
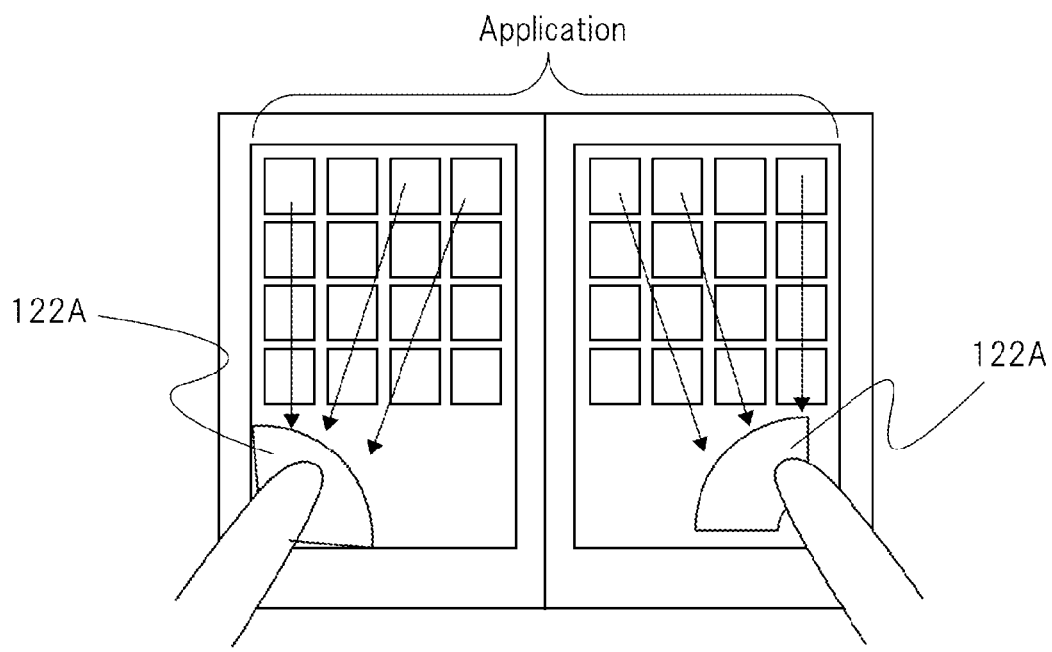
FIG. 15 is a view showing another status example of the information processing terminal.
Figure 16:
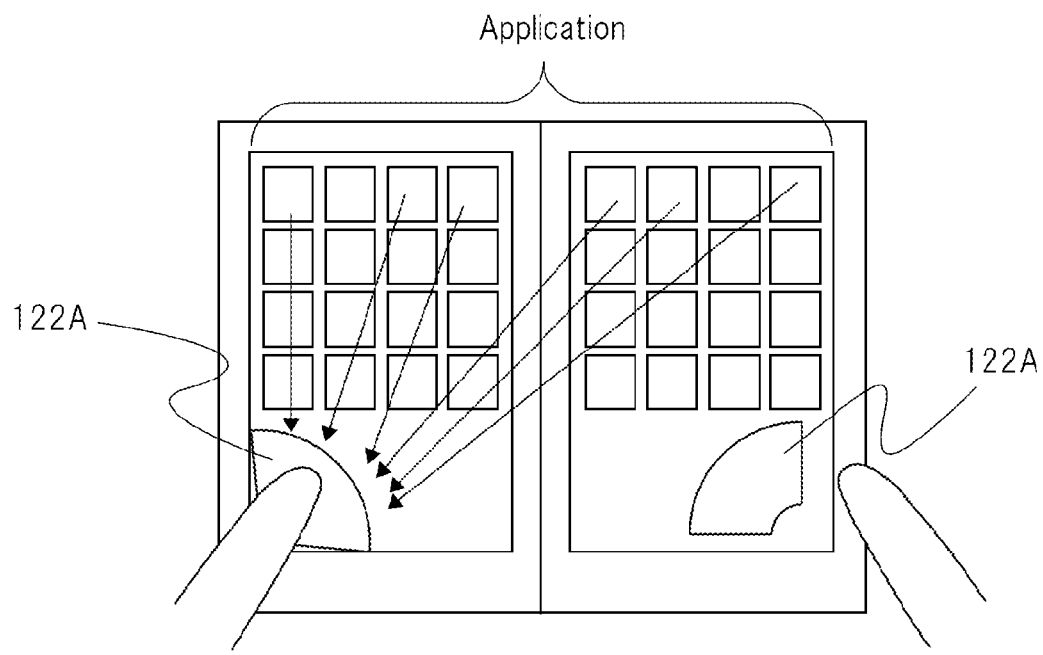
FIG. 16 is a view showing another status example of the information processing terminal.
Figure 17:
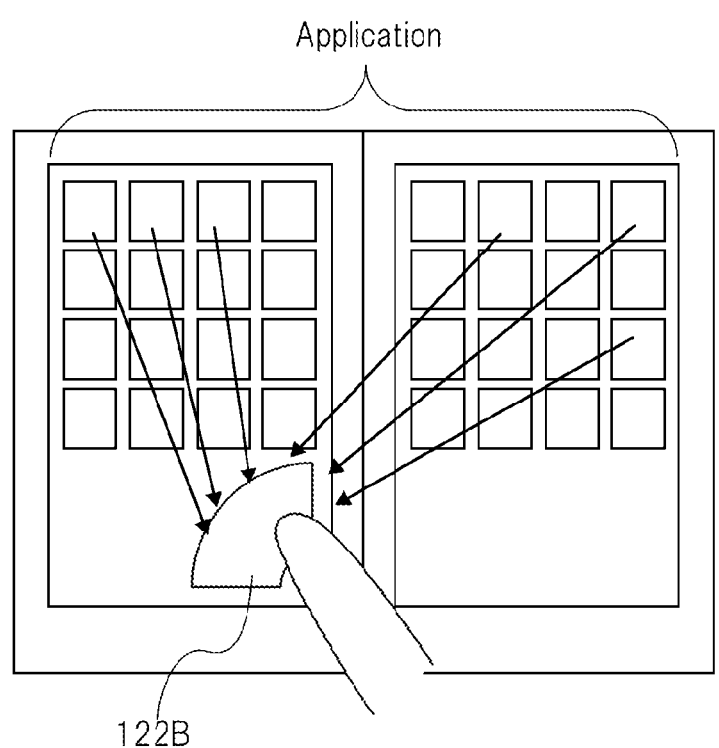
FIG. 17 is a view showing another status example of the information processing terminal.

For example, when both first areas 122A are detected as the detected areas, control unit 3 moves to each first area 122A, the operational objects inside the display screen including that first area 122A, as shown in FIG. 15. When one of first areas 122A is detected as the detected area, control unit 3 moves all the operational objects to second area 122A as the detected area, as shown in FIG. 16. Further, when the detected area is second area 122B, control unit 3 moves all the operational objects to second area 122B as the detected area, as shown in FIG. 17.

When the application is executed in single-screen mode, if the detected area is first area 122A, control unit 3 moves the operational objects in the display screen including the detected area, among display screens 112 and 113. On the other hand, if the detected area is second area 122B, control unit 3 moves the operational objects included in both display screens 112 and 113.

Figure 18:
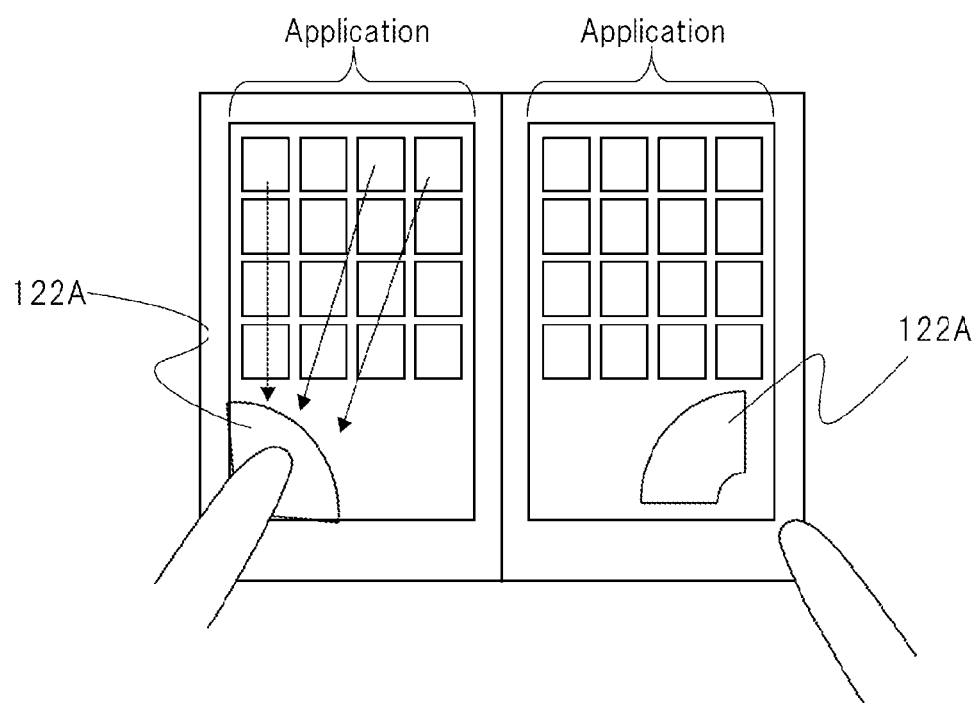
FIG. 18 is a view showing another status example of the information processing terminal.

For example, when one of first areas 122A is the detected area, control unit 3 moves to the first area 122A as the detected area, the operational objects inside the display screen including that detected area, as shown in FIG. 18. When both first areas 122A are detected as the detected areas, or when the detected area is second area 122B, control unit 3 will perform the same process as that when the application is executed in full-screen mode.

As described heretofore, according to the present exemplary embodiment, when the application is executed in full-screen mode, control unit 3 moves all the operational objects in display screens 112 and 113, whereas when the application is executed in single-screen mode, the control unit moves the operational objects in the display screen including the detected area. Accordingly, it is possible to move only the operational objects that correspond to the application that the user is using, hence it is possible to improve operability.

In the present exemplary embodiment, when the application is executed in single-screen mode, control unit 3 moves the operational objects included in all display screens 112 and 113 if the detected area is second area 122B, whereas if the detected area is first area 122A, the control units moves the operation objects in the display screen that includes that detected area. Accordingly, when the user holds the information processing terminal with one hand, it is possible to operate multiple applications without changing the holding style.

Next, the fourth exemplary embodiment will be described.

In the present exemplary embodiment, a case where setting areas 122 change depending on the posture of information processing terminal 101 will be described in further detail.

Figure 19:
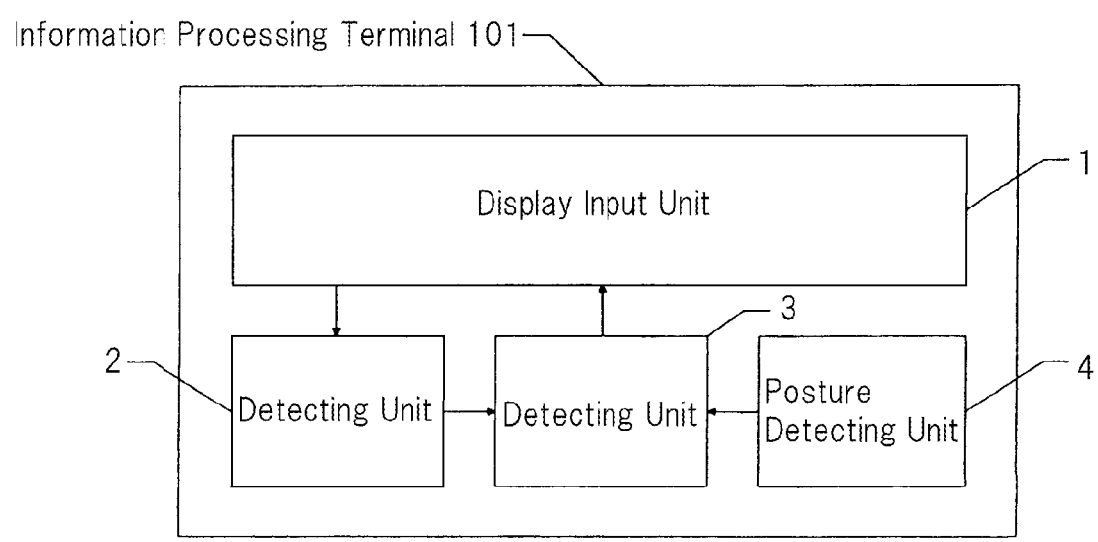
FIG. 19 is a block diagram showing a functional configuration of an information processing terminal in the fourth exemplary embodiment.

FIG. 19 is a view showing a functional configuration of information processing terminal 101 of the present exemplary embodiment. In FIG. 19, information processing terminal 101 further includes posture detecting unit 4, in addition to the configuration shown in FIG. 2.

Posture detecting unit 4 includes a six-axis sensor, an acceleration sensor and the like, and detects the posture of information processing terminal 101. Here, the posture of information processing terminal 101 means, for example, the inclinations of display screens 112 and 113 relative to the horizontal plane, and the like.

Control unit 3 sets up setting areas 122 at positions according to the detected result of posture detecting unit 4. More specifically, control unit 3, based on the detected result from posture detecting unit 4, determines whether information processing terminal 101 is held vertically or horizontally.

Figure 20A:
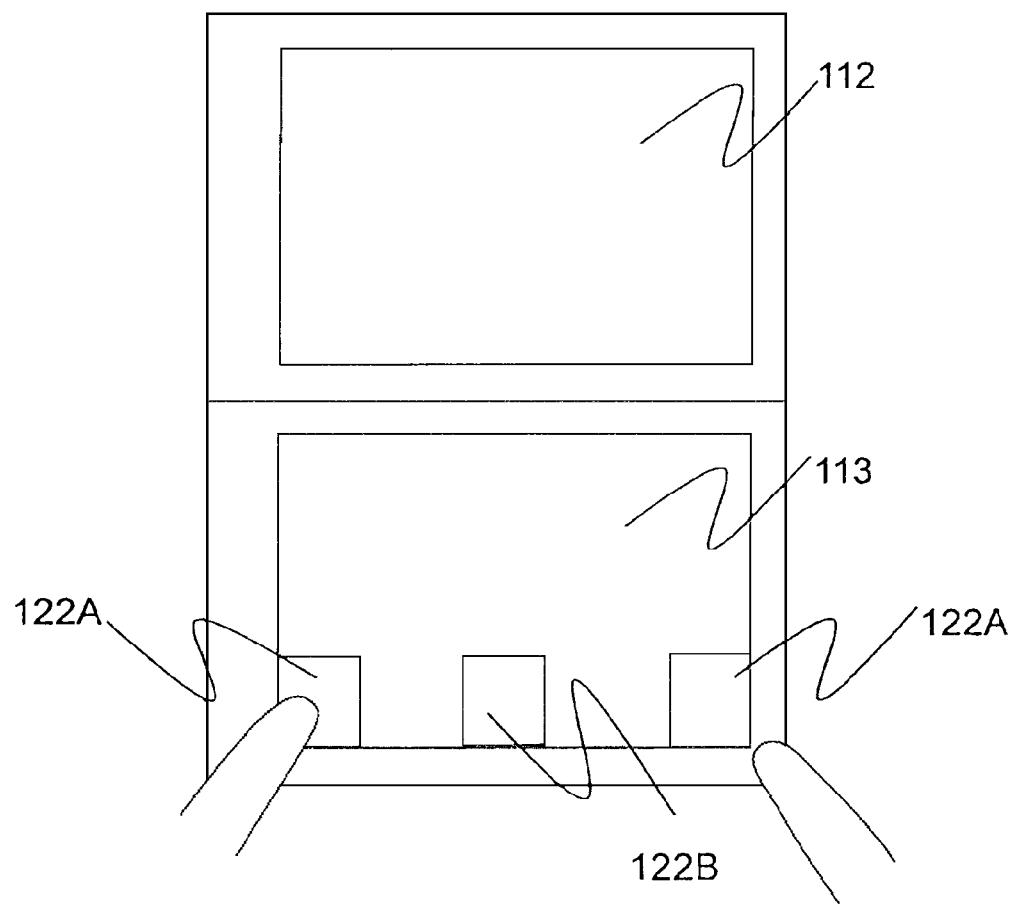
FIG. 20A is a view showing one example of a setting area in the fourth exemplary embodiment.

FIG. 20A is a front view of information processing terminal 101 held vertically. In FIG. 20A, the terminal is held such that display screens 112 and 113 can be viewed at top and bottom by the user. Further, of display screens 112 and 113, display screen 113 located below when viewed by the user is set up with first areas 122A near both side corners on the bottom side while a second area 122B is set up around the center on the bottom side of display screen 113.

Here, the positions and number of first areas 122A and second area 122B shown in FIG. 20A are a mere example. For example, first areas 122A may be arranged on both corners of the upper side of display screen 113 as shown in FIG. 20B, or two second areas 122B may be provided as shown in FIG. 20C. Further, information processing terminals 101 of the first to third exemplary embodiments (FIGS. 1 and 5, for example) are examples when information processing terminal 101 is held horizontally.

The operations, when the predetermined touch operations are made on setting areas 122, are the same as those of information processing terminals 101 in first to third exemplary embodiments. It should be noted that, depending on setting area 122, control unit 3 may change the related that region corresponds to the setting area.

As described heretofore, according to the present exemplary embodiment, setting areas are set up at positions according to the posture of information processing terminal

101. Accordingly, if the position that the user finds it easy to hold a terminal 100 change according to the posture of information processing terminal 101, it is possible to adjust the positions of operational objects so as to improve operability.

Although the present invention has been explained with reference to the exemplary embodiments, the present invention should not be limited to the above exemplary embodiments. Various modifications that can be understood by those skilled in the art may be made to the structures and details of the present invention within the scope of the present invention.

This application claims priority based on Japanese Patent Application No. 2010-105397, filed on Apr. 30, 2010, and should incorporate all the disclosure thereof herein.

DESCRIPTION OF REFERENCE NUMERALS

1 display input unit
2 detecting unit
3 control unit
4 posture detecting unit
101 information processing terminal
111-113 display screens
114, 115 components

What is claimed is:

1. An information processing terminal comprising:
    a display input unit comprising a display screen and configured to receive a touch operation made to the display screen;
    a detecting unit configured to detect a position at which the touch operation has been made on the display screen; and,
    a control unit configured to control the display screen to display a plurality of operational objects on the display screen,
    wherein the control unit is further configured to, when the touch operation is made and a plurality of detected areas are detected, distribute and move the plurality of operational objects to the plurality of detected areas, each of the plurality of detected areas being a setting area that comprises the operated position detected by the detecting unit, each of the setting areas being a setting area from among a plurality of setting areas set up in the display screen.

2. The information processing terminal according to claim 1, wherein
    a related region is a region that comprises one or more related operational objects from among the plurality of operational objects, said related region being designated for each setting area, and
    the control unit is further configured to move the one or more operational objects included in the related region of a detected area.

3. The information processing terminal according to claim 2, wherein
    the touch operations comprises a first operation and a second operation,
    the control unit is further configured to, when the display input unit receives the first operation, move the operational objects included in a related region of the detected area, and
    the control unit is further configured to, when the display input unit receives the second operation, move the operational objects included in all the related regions of setting areas.

4. The information processing terminal according to claim 1, wherein the control unit is further configured to use all the plurality of detected areas as areas for displaying the plurality of operational objects.

5. The information processing terminal according to claim 1, wherein of the display unit comprises a plurality display screens, each having at least one setting area.

6. The information processing terminal according to claim 5, wherein the control unit is further configured to move the operational objects in the display screen including a detected area among the plurality of display screens.

7. The information processing terminal according to claim 6, wherein
    the control unit is further configured to, when an application that generates displayed information including the operational objects is executed in multiple screen mode for displaying the displayed information across the multiple display screens, move all the operational objects in the plurality of display screens, and
    the control unit is further configured to, when the application is executed in single-screen mode for displaying the displayed information on one of the plurality of display screens, move the operational objects in the one display screen that includes the detected area.

8. The information processing terminal according to claim 7, wherein
    the setting areas comprise a first area and a second area,
    the control unit is further configured to, when the application is executed in the single screen mode, move the operational objects inside the one display screen including the detected area if the detected area resides in the first area, and move the operational objects included in all the plurality of display screens if the detected area resides in the second area.

9. The information processing terminal according to claim 1, further comprising a posture detecting unit configured to detect the posture of the information processing terminal, wherein
    the control unit is further configured to set up the setting area at a position in accordance with the detected result of the posture detecting unit.

10. An operation control method of an information processing terminal comprising a display screen, the operation control method comprising:
    displaying a plurality of operational objects on the display screen;
    receiving a touch operation made to the display screen;
    detecting a position at which the touch operation has been made on the display screen; and,
    distributing and moving, when there are a plurality of detected areas, the plurality of operational objects to the plurality of detected areas, each of the plurality of detected areas being a setting area that comprises the detected operated position, each of the setting areas being a setting area from among a plurality of setting areas set up on the display screen.

* * * * *